United States Patent

[11] 3,593,575

[72] Inventor Horst R. Thieme
Horsham, Pa.
[21] Appl. No. 696,030
[22] Filed Jan. 5, 1968
[45] Patented July 20, 1971
[73] Assignee Emerson Electric Co.
St. Louis County, Mo.

[54] COMBINATION FLOW METER AND CONTROL VALVE
19 Claims, 2 Drawing Figs.
[52] U.S. Cl..................................... 73/199, 73/207
[51] Int. Cl..................................... G01f 1/02
[50] Field of Search........................... 73/199, 207, 208

[56] References Cited
UNITED STATES PATENTS
2,367,544 1/1945 Udale ........................ 73/207
2,402,355 6/1946 Whaley ...................... 73/199 X
2,687,144 8/1954 Rafferty ..................... 73/199 X
FOREIGN PATENTS
867,312 10/1941 France ....................... 73/199

Primary Examiner—Charles A. Ruehl
Attorney—Philip B. Polster

ABSTRACT: A combination variable area meter and flow limiter having a pilot valve plug and a readout magnet attached to a float rod of the variable area meter. Seating of the pilot valve plug in an adjustable pilot valve seat increases pressure in a control chamber, forcing down a skirt-guided plug and diaphragm assembly to limit the flow. A shutoff valve downstream of the pilot valve seat overrides the adjustable flow limit for shutoff without altering the flow limit setting.

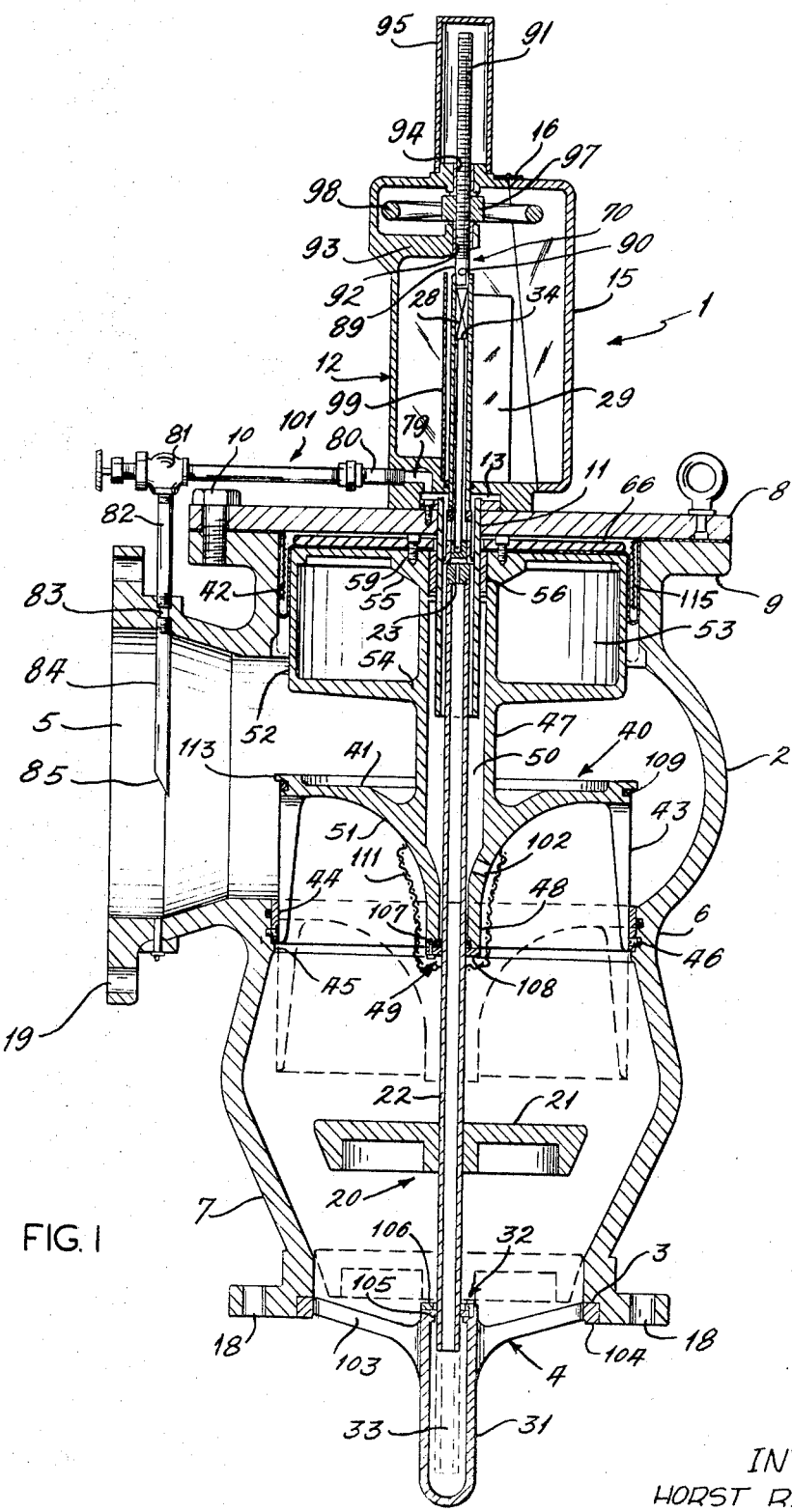
FIG. 1
INVENTOR:
HORST R. THIEME
ATTORNEY.

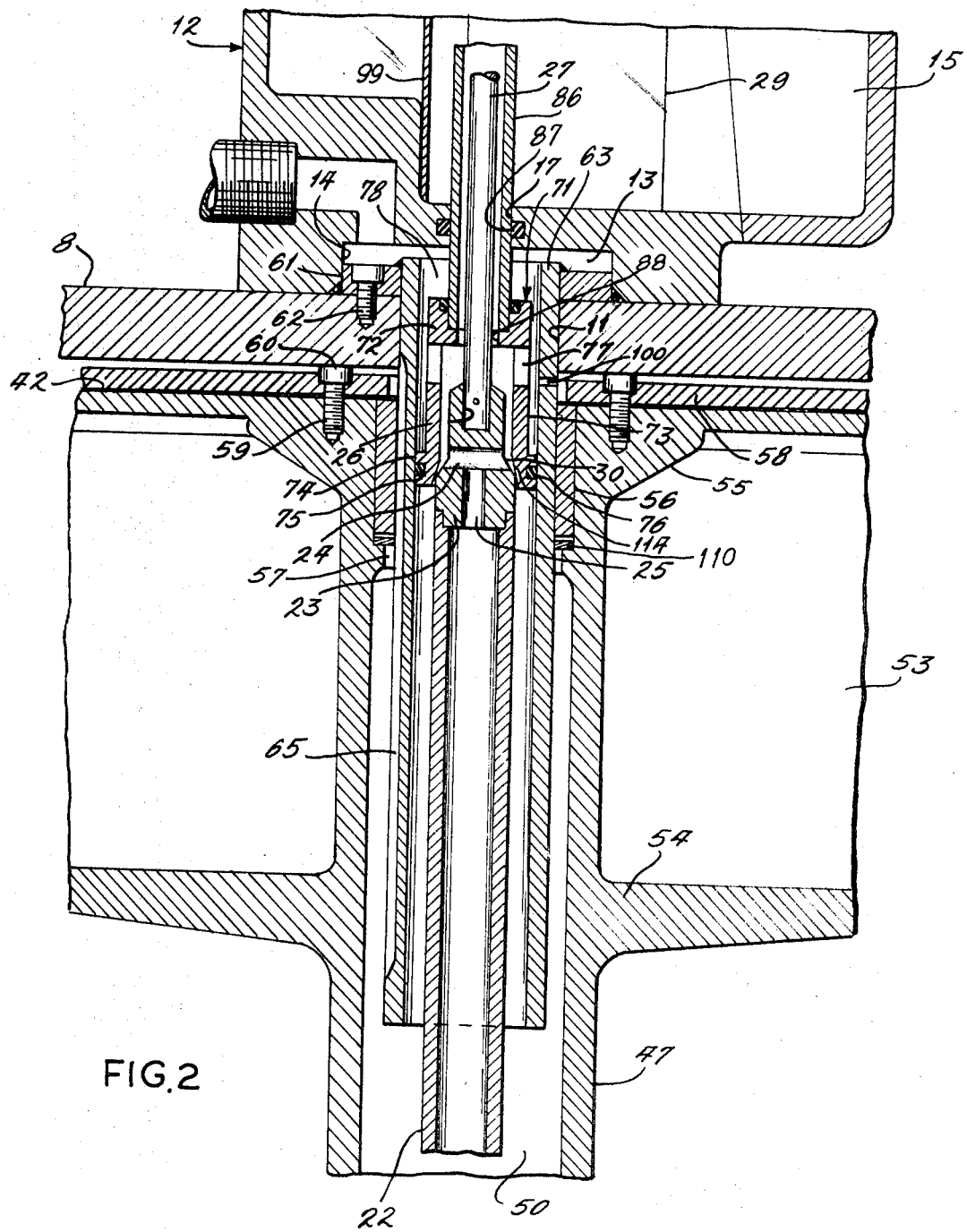
FIG.2
INVENTOR:
HORST R. THIEME
ATTORNEY.

COMBINATION FLOW METER AND CONTROL VALVE

BACKGROUND OF THE INVENTION

This invention relates to flow meters and in particular to a combination flow meter, flow controller, and shutoff valve. It has particular application to controlling and measuring the flow of water in low pressure, high volume systems, such as irrigation systems, but it may be used wherever a variable controlled and measured flow of liquid is desired.

One of the objects of this invention is to provide a combination flow meter and control valve which acts as a flow meter independently of the control function until the predetermined flow limit is reached.

Another object is to provide such a combination which, when the predetermined flow limit is reached, activates a control means to maintain the flow at the predetermined maximum, whether a tendency for the flow to increase or decrease is caused by a change in upstream pressure or downstream pressure.

Still another object is to provide such a combination in which a shutoff means may be used to activate the control means independently of the flow limit setting.

Other objects will become apparent to those skilled in the art in the light of the following description and accompanying drawing.

SUMMARY OF THE INVENTION

In accordance with this invention, generally stated, a device for limiting the flow of a liquid is provided comprising a flow-limiting means, a control means adapted to control the flow-limiting means, and a flow-sensing means. The flow-sensing means includes a variable area meter and is operatively connected to the pilot means. The pilot means is adapted to cooperate with the control means when and only when the flow closely approaches a predetermined maximum.

In the preferred embodiment, the variable area meter comprises a float and float rod slidably mounted in an inverted frustoconical housing. The pilot means is a pilot valve plug securely mounted on the float rod. The upper end of the float rod carries a magnet for magnetically coupled readout.

Also in the preferred embodiment the flow-limiting means is a skirt-guided plug and diaphragm assembly having a central vertical aperture through which the float rod passes in a freely slidable manner.

Also in the preferred embodiment the control means comprises a control chamber which is segregated from the other chambers of the device by a rolling diaphragm seal secured to the upper edge of the skirt guided plug and to the housing of the device, but which continuously communicates with the inlet side of the skirt-guided plug through the central aperture in the skirt-guided plug. A control line to the outlet side of the device communicates with the central aperture in the skirt-guided plug through an axially adjustable pilot valve seat. When the pilot valve plug carried by the float rod seats in the pilot valve seat, communication through the pivot valve is interrupted, pressure builds up in the control chamber, the skirt-guided plug is forced downward to restrict the outlet passage, and the pilot plug slowly unseats until a condition of equilibrium is established.

Also in the preferred embodiment, the float rod is hollow between its lower end and the pilot valve plug, and acts as a means of communication between a sealed chamber in which the lower end of the rod is slidably mounted and the control line, through the pilot valve plug and the pilot valve seat.

Also in the preferred embodiment, a valve in the control line is provided which overrides the flow limit setting and causes the skirt-guided plug to cut off all flow.

BRIEF DESCRIPTION OF THE DRAWING

In the drawing,

FIG. 1 is a sectional view taken through vertical axis of one illustrative embodiment of combination flow meter and control valve of this invention; and FIG. 2 is a detail of valving shown in FIG. 1.

DESCRIPTION OF THE PREFERRED EMBODIMENT

Referring now to the drawing, reference numeral 1 indicates one illustrative embodiment of a combination flow meter and control valve of this invention. The combination meter and valve 1 has a casing 2 having an annular rabbet 3 at its lower end for mounting an inlet guide 4, and having an outlet aperture 5 on one lateral side. The inlet guide 4 is in the form of a cast spider having three narrow legs 103 joining a peripheral mounting ring 104 and a hollow downwardly protruding finger 31. The casing 2 also has an inwardly pinched waist 6. Below the waist 6 the casing 2 slopes flatly inwardly toward its bottom to form an inverted frustoconical segment 7 of the casing 2. A top cover 8 is mounted on a top flange 9 of the casing 2 by means of bolts 10. The top cover 8 has a central aperture 11. An instrument casing 12 having a shallow cavity 13 in its lower face is bolted to the upper face of the top cover 8. The cavity 13 in the instrument casing 12 is concentric with, but larger in diameter than, the central aperture 11 in the top cover 8. The wall defining the upper face of the cavity 13 has a central aperture 17 of smaller diameter than the central aperture 11 in the top cover 8. The instrument casing 12 is provided with an access door 15 having hinges 16 on its upper edge.

Within the casing 2 and instrument casing 12 are three somewhat interdependent systems: a flow-sensing system 20, a flow-limiting system 40, and a flow control system 70.

The flow-sensing system 20 includes a float 21 welded to a hollow float rod 22. On the upper end of the hollow float rod 22 is mounted a pilot valve plug 23 having a horizontal bore 24 through it, communicating with the inside of the hollow rod 22 through a longitudinal bore 25 in the pilot valve plug 23. The horizontal bore 24 opens above a shoulder 30 on the pilot valve plug 23. To the top of the pilot valve plug 23 is welded a float rod extension 27 on the upper end of which a magnet 28 is carried in a capsule 34, threaded onto the extension 27. Appropriate readout equipment 29, sensitive to changes in the vertical position of the magnet 28, is mounted in the instrument casing 12.

The lower end of the hollow float rod 22 extends into the hollow downwardly protruding finger 31 of the inlet guide 4 through a gland 32 in the root of the finger 31. The gland 32 includes a solid annular ring 105 restrained from axial movement by a retaining ring 106. The annular ring 105 is allowed some lateral movement, to facilitate alignment of the float rod 22. The annular ring 105 may have a slight clearance, for example, 0.005 inch, from the float rod 22. The seal is therefore not a perfect one. A chamber 33, sealed from the adjacent chamber within the casing 2 but communicating through the hollow float rod 22 with the horizontal bore 24 in the pilot valve plug 23, is thus formed. Above the float 21, the float rod 22 is slidably supported by parts of the flow-limiting system 40 and flow control system 70, as hereinafter described.

The float 21 is so positioned on the float rod 22 as to move from the bottom of the casing 2 at the lowermost position of its travel to near the top of the frustoconical segment 7 of the casing 2 at its uppermost position. The float 21 is so proportioned that its upper periphery nearly touches the casing 2 at the lowermost point of its travel. The periphery of the float 21 tapers downwardly inward at an angle from the vertical.

The flow-limiting system 40 includes a skirt-guided plug 41 and a diaphragm 42. The skirt-guided plug 41 includes a contoured skirt 43 of cylindrical configuration, which is snugly slidably mounted in a seat ring 44 secured in a removable manner to the innermost face of the waist 6 of the casing 2 by a shoulder 45 and setscrews 46. The skirt 43 and seat ring 44 form a modified V-port valve, for control at low flows and for smooth shutoff. An O-ring 109 journaled in a shoulder 113 on the upper edge of the skirt 43 assures tight shutoff. The shoulder 113 restrains the skirt-guided plug 41 from excessive downward movement. Radially within the skirt 43 is an inner wall 47 which extends axially the length of the skirt-guided plug 41. At its lower end, the inner wall 47 is pinched to form a neck 48 having an inner diameter somewhat larger than the outer diameter of the float rod 22. A gland 49 in the lower end of the neck 48 forms a slidable seal with the float rod 22. The gland 49 includes a solid annular ring 107 constrained from axial movement by a retaining ring 108. The annular ring 107 is allowed some lateral movement, to facilitate alignment of the float rod 22. The annular ring 107 may have a slight clearance, for example, 0.005 inch, from the float rod 22. The seal is therefore not perfect. Above the neck 48 the inner wall 47 widens to form a chamber 50 around the float rod 22. The neck 48 is joined to the skirt 43, by an upwardly bulged wall 51 to assure a smooth flow of fluid from the bottom of the skirt-guided plug 41 through the skirt 43. A pilot circuit restriction orifice 102 is provided in the bulged wall 51, to allow a restricted passage for liquid from the inlet side of the combination meter and valve 1 to flow into the chamber 50 in the skirt-guided plug 41. A strainer 111 is provided around the neck 48 and bulged wall 51 to a height above the orifice 102, for the purpose of preventing blockage of the orifice 102. The inner wall 47 also serves to connect the lower, skirt portion of the skirt-guided plug 41 with an upper, float portion having a float chamber defining wall 52 enclosing a float chamber 53. The float chamber 53 is proportioned to lighten the skirt-guided plug 41 in the liquid which is to be used in the device, without making it buoyant. The inner wall 47 and float chamber wall 52 join at an axially lower junction 54 and an axially upper junction 55. At the upper junction 55, a sleeve 56 is press fitted to the inner face of the inner wall 47. Between the lower end of the sleeve 56 and a shoulder 57 on the inner wall 47 a damping ring 110 is provided. Because the sleeve 56 is primarily a bearing, it may be made of a suitable bearing material, as for example a sintered carbon material. The damping ring is preferably made of a wear-resistant material such as stainless steel. The sleeve 56 is held against upward movement by a plate 58 held on the upper face of the junction 55 by bolts 59. The head 60 of each bolt 59 extends above the plate 58, to abut the top cover 8 when the skirt-guided plug is in its uppermost position.

Above the central aperture 11 in the top cover 8 is a ring 61 the inner circumference of which is congruent with, and aligned with, the aperture 11, and the outer circumference of which fits snugly within the periphery 14 of the cavity 13. The ring 61 is held to the top cover 8 by screws 62. A cylindrical cartridge 63 is fitted snugly within the aperture 11 and ring 61 and extends upward into the cavity 13 slightly above the ring 61, where it is welded to the ring 61. The lower end of the cartridge 63 extends into the chamber 50 in the skirt-guided plug 41. The cartridge 63 is spaced radially inward from the inner wall 47 of the plug 41 and radially outward from the float rod 22. From a point just below the top cover 8 to a point just above its bottom, the exterior of the cartridge 63 is provided with a flat 65. The remainder of the cartridge 63 abuts the sleeve 56 at all axial positions of the skirt-guided plug 41 to prevent radial wobbling of the of the float portion of the skirt-guided plug 41, but to allow its free axial movement.

The rolling diaphragm 42 is secured around its outer periphery between the top flange 9 of the casing 2 and the top cover 8. A retaining ring 115 holds the outer portion of the diaphragm 42 against the inside of the casing 2. The diaphragm 42 is provided with a central hole somewhat larger than that provided the plate 58, and is secured to the upper face of the float chamber defining wall 52 of the skirt-guided plug 41 by the plate 58. The diaphragm 42 thus segregates a control chamber 66 above the skirt-guided plug 41. The flat 65 provides a passage for liquid to pass continuously between the chamber 50 inside the skirt-guided plug 41 and the control chamber 66 at any axial position of the skirt-guided plug 41, until the skirt-guided plug 41 descends to about 1 inch from being seated. When the skirt-guided plug 41 is below this point, a much more restricted passage is provided between the cartridge 63 and the damping ring 110. Because the damping ring 110 is made of a wear-resistant material, the size of this passage will not vary significantly even after the sleeve 56 becomes worn.

The flow control system 70 includes a pilot valve seat 71, having a top wall 72 and sidewall 73, slidably mounted within the cartridge 63. A shoulder 74 on the lower outside edge of the sidewall 73 spaces the sidewall 73 from the cartridge 63. An annular channel 75 for an O-ring 76 is provided in the shoulder 74. The pilot valve seat 71 is thus liquidtightly but slidably mounted in the cartridge 63.

The inside diameter of the pilot valve seat 71 is somewhat smaller than the outside diameter of the pilot valve plug 23. The lower inside edge of the sidewall 73 is provided with a seating chamfer 114. The chamfer 114 is proportioned to form a liquidtight fit with the edge of the shoulder 30 on the pilot valve plug 23.

Immediately below the top wall 72 the sidewall 73 is provided with ports 77. Thus, when the pilot valve plug 23 seats in the pilot valve seat 71, a pilot valve seat chamber 78 above the O-ring 76 is cut off from the chamber 50 inside the skirt-guided plug 41. The pilot valve seat chamber 78 includes the volume above the O-ring 76 within the cartridge 63, both within and without the pilot valve seat 71, and also includes the volume within the cavity 13 in the instrument casing 12. The pilot valve seat chamber 78 communicates with the chamber 33 in the finger 31 through the hollow float rod 22. The chamber 78 also communicates with the control chamber 66 and the chamber 50 inside the skirt-guided plug 41 through a tiny bleeder port 100. The chamber 78 also communicates with the outlet aperture 5 through a control line 101. The control line 101 extends through a control passage 79 which enters the instrument casing 12 through the wall defining the upper face of the cavity 13 near its periphery 14 and discharges at a threaded opening in the side of the instrument casing 12, through a control pipe 80 threaded into the opening in the side of the casing 12, through a manual shutoff valve 81, through a downstream control pipe 82, through a tapped hole 83 in the casing 2, the diameter of which is equal to that of the pipe 82, and through an outlet tube 84 into the outlet aperture 5. The outlet tube 84 is provided with a chamfer 85 on its downstream side and therefore acts as an aspirator tube.

Thus, when the pilot valve plug 23 is not seated in the pilot valve seat 71, the chamber 50 inside the skirt-guided plug 41 and the control chamber 66 communicates through the pilot valve seat 71 and control line 101 with the outlet aperture 5.

The pilot valve seat 71 is adjustable axially by means of a hollow control rod 86 welded to the top wall 72 of the pilot valve seat 71. The hollow control rod 86 passes snugly but slidably through the central aperture 17 in the cavity 13. The joint between the control rod 86 and the aperture 17 is sealed by an O-ring 87 journaled in the aperture 17. The float rod extension 27 passes into the interior of the hollow control rod 86 through a hole 88 in the top wall 72 of the pilot valve seat 71. The capsule 34 in which the magnet 28 is mounted on the float rod extension 27 is larger in diameter than the float rod extension and forms a slidable guide with the inside surface of the hollow control rod 86. Above the highest point of axial movement of the magnet 28 the hollow control rod 86 is capped by a plug 89 through which is mounted an antispin rod 90. The antispin rod 90 extends into an elongate vertical groove, not shown, in the instrument casing 12. The groove allows axial, but restrains rotational, movement of the plug 89. The upper end of the plug 89 is securely attached to a threaded rod 91, which passes through an aperture 92 in a support arm 93, through an aperture 94 in the upper wall of the instrument casing 12 and into a housing 95. The support arm 93 is cast as an integral part of the instrument casing 12 in such a position that the aperture 92 is spaced from the upper wall of the instrument casing 12. An internally threaded hub 97 of a handwheel 98 is threaded onto the rod 91 and held in a fixed axial position by and between the upper wall of the casing and the support arm aperture 92. The handwheel 98 provides for easy raising and lowering of the pilot valve seat 71. Suitable indication means 99, calibrated in terms of maximum flow, are provided adjacent the elongate slot into which the antispin rod 90 projects.

In operation, the combination flow meter and control valve 1 is bolted to a vertical pipe (not shown) by means of bolts extending through bolt holes 18 on the lower face of the casing 2. Bolt holes 19 on the side flange of the casing 2 are provided for bolting the combination meter and valve 1 to a horizontal outlet pipe (not shown).

The handwheel 98 is rotated until the position of the antispin rod 90 relative to the indication means 99 indicates the desired flow. At this position of the handwheel 98, the pilot valve seat 71 is adjusted to an axial position barely above that which the pilot valve plug 23 will reach when the flow reaches the volume desired. The shutoff valve 81 is then opened.

If the flow through the combination meter and valve 1 is less than the maximum selected, but large enough to open the skirt-guided plug 41, the flow-sensing system 20 operates freely as a variable area meter. The float 21 rises and falls in the frustoconical segment 7 of the casing 2 in response to the flow. The float rod 22 moves freely with the float 21. The chamber 50 in the skirt-guided plug 41 communicated with the inlet side of the combination meter and valve 1, through the pilot circuit restriction orifice 102. The control chamber 66 communicates with the chamber 50 in the skirt-guided plug 41. Any air in the control chamber 66 will be forced out through the small bleeder port 100. Because the pilot valve plug 23 is not seated in the pilot valve seat 71, and the restriction orifice 102 restricts flow into the chamber 50 in the skirt-guided plug 41, a virtually unrestricted flow exists from the chamber 50 into the control line 101. Therefore, little back pressure above that in the outlet 5 is exerted by the control chamber 66.

When the flow reaches or slightly exceeds the selected maximum, the pilot valve plug 23 seats in the pilot valve seat 71 and cuts off the control line 101 from the control chamber 66 and the chamber 50 in the skirt-guided plug 41, except through the small bleeder port 100. The pressure in the control chamber 66 then increases, and the skirt-guided plug 41 is forced downward to restrict the flow of fluid through the skirt 43. As the skirt-guided plug 41 decreases the flow of the fluid, the float 21 and float rod 22 drop, and the pilot valve plug 23 unseats. Because a passage from the control line 101 to the control chamber 66 is now opened, the pressure in the control chamber 66 slowly decreases and the skirt-guided plug 41 rises slowly. The float 21 responds to the increased flow by rising until the pilot valve plug 23 seats again in the pilot valve seat 71. This process continues until a condition of equilibrium is reached, at which point the pilot valve plug 23 is slightly unseated from the pilot valve seat 71 so as to restrict the passage through the pilot valve seat 71 between the control line 101 and the control chamber 66. In practice, the movement of the float rod 22 and of the skirt-guided plug 41 are damped so that the plug 23 may not seat completely in the seat 71, and equilibrium is reached after at most one overshoot and one undershoot of the desired flow. A constant pressure is then maintained in the control chamber 66. It will be seen that the float 21 still operates as a variable area meter.

Should the flow increase because of either an increase in upstream pressure or a decrease in downstream pressure, the float 21 rises, the pilot valve plug 23 seats in the pilot valve seat 71, pressure in the control chamber 66 increases, and the skirt-guided plug 41 is forced downward to cause a reduction in flow until a balanced condition is again reached. If the flow decreases because of either a decrease in upstream pressure or an increase in downstream pressure, the float 21 drops, the pilot valve plug 23 moves away from the pilot valve seat 71, pressure in the control chamber 66 decreases, and the skirt-guided plug 41 rises to allow an increase in flow until a balanced condition is again established.

It will be seen that within broad tolerances of the other parts the accuracy of the flow limit setting is dependent only on the accuracy of the flow-sensing means 20, because the equilibrium position will always be very close to, but slightly below, the point at which the pilot valve plug 23 carried by the flow-sensing means 20 seats in the pilot valve seat 71, that is, at the highest point of free travel of the flow-sensing means 20.

It will also be seen that the provision of a hollow float rod 22 connecting the pilot valve seat chamber 78 with the chamber 33 in the inlet guide 4 balances the flow-sensing system 20 against changes in upstream or downstream pressures which could otherwise cause inaccuracies. This feature is important in preventing loading of the flow-sensing system by the control system and allows the flow-sensing means to operate accurately at the balanced condition. It is theoretically possible, by adjusting the diameter of the pilot valve plug 23, to compensate exactly for changes in leakage flow through the gland 32 caused by pressure changes.

Because the flat 65 in the sleeve 63 terminates at a point above that which the damping ring 110 reaches at total shut off, the final stages of shut off are very slow. The provision of the wear-resistant damping ring 110 ensures continued slow shut off over the age of the device.

To shut off all flow through the combination flow meter and control valve 1, it is only necessary to close the manual shut off valve 81. The passage through the control line 101 between the outlet aperture 5 and the chamber 50 in the skirt-guided plug 41, and hence the control chamber 66, is then cut off. The pressure in the control chamber 66 continually builds up, and the skirt-guided plug 41 drops until the outlet passage through the skirt 43 is completely cut off, as shown in broken lines in FIG. 1. A slight unbalance in seating condition and the weight of the skirt-guided plug 41, especially if the liquid on the outlet side of the skirt 43 is allowed to drain out, assure tight shutoff under all pressure conditions. When the shutoff hand valve 81 is reopened, the combination flow meter and control valve 1 immediately resumes operation and will limit the flow to the same selected value as before the flow was shut off.

All flow may also be shut off by setting the flow control setting at zero flow. At this setting, the pilot valve plug 23 seats in the pilot valve seat 71 when the float 21 is at its lowermost position. Because the flow control setting is controlled by the handwheel 98 inside the instrument casing 12, and because the access door 15 can be locked, this method of shutting off flow prevents unauthorized resumption of use.

Numerous variations in the construction of the combination flow meter and control valve of this invention, within the scope of the appended claims, will become apparent to those skilled in the art in the light of the foregoing disclosure. For example, the flow meter may be positioned downstream of the flow-limiting means, even in a separate housing. The flow-limiting means may be a valve other than a skirt-guided valve, for instance a butterfly valve. The pilot circuit orifice may be in the outer casing of the flow meter-control valve combination, and the pilot circuit made external of the casing. The diaphragm segregating the control chamber from the other chamber may be of types other than rolling, such as sliding. These variations are merely illustrative.

Having thus described the invention, what I claim and desire to be secured by Letters Patent is:

1. A device for metering and controlling the flow of a fluid, comprising flow-limiting means; control means for controlling said flow-limiting means, said control means comprising a control chamber having a movable wall for expanding and contracting said control chamber in response to fluid pressure in said control chamber, said movable wall being operatively connected to said flow-limiting means, said control means further comprising a fluid pilot circuit including a pilot valve part for controlling pressure in said control chamber; flow-sensing means comprising a variable area meter; and pilot means, carried by said variable area meter, for causing said control means to control said flow-limiting means, said pilot means cooperating with said pilot valve part when and only when the flow closely approaches a predetermined maximum to vary pressure in said control chamber and thereby to maintain said flow at said predetermined maximum.

2. The device of claim 1 wherein the pilot means carried by said variable area meter comprise a restriction valve member proportioned and arranged to cooperate with said pilot valve part in said fluid pilot circuit when said flow closely approaches said predetermined maximum.

3. The device of claim 2 wherein the pilot valve part in said fluid pilot circuit is adjustably mounted in said device.

4. The device of claim 2 wherein the pilot means is secured to said variable area meter.

5. A device for measuring the flow of liquid passing through it and for maintaining the flow thereof at an adjustable predetermined maximum, comprising a casing having an inlet and an outlet, a plug mounted within said casing, said plug being movable to restrict the flow of liquid between said inlet and said outlet, a control means for moving said plug to restrict the flow of liquid between said inlet and said outlet when pressure in said control means is increased, a variable area meter, said meter including a float and a float rod, first passage means between said inlet and said control means, restriction means in said first passage means, second passage means between said outlet and said control means, and a pilot valve means for restricting said second passage means, said pilot valve means comprising a first member carried on said float rod and a second, adjustable, member proportioned and arranged to mate with said first member to restrict said second passage means when said flow closely approaches said adjustable predetermined maximum to increase pressure in said control means, thereby moving said plug to restrict flow between said inlet and said outlet when said flow approaches said predetermined maximum, said first member moving relative to said second member with changes in said flow above and below said predetermined maximum to vary the restriction in said second passage means and thereby to increase and to decrease pressure respectively in said control means thereby moving said plug to maintain said flow at said predetermined maximum.

6. The device of claim 5 including a shutoff valve in said second passage means, said shutoff valve being operable to shut off flow through said device independent of said pilot valve.

7. The device of claim 5 wherein said float rod is hollow and an aperture in said first member communicates through said float rod with a chamber into which an end of said float rod passes.

8. The device of claim 5 wherein said plug comprises a skirt-guided plug.

9. The device of claim 8 wherein said first passage means comprises a passage through said skirt-guided plug.

10. The device of claim 5 wherein said first member is carried fixedly on said float rod.

11. The device of claim 5 wherein said first member is a valve plug and said second member is a valve seat.

12. A device for measuring the flow of fluid passing through it and for maintaining said flow at a predetermined maximum, comprising a variable area meter, flow-indicating means cooperative with said variable area meter, flow-limiting means for restricting flow through said device, and control means for moving said flow-limiting means, said variable area meter comprising a float, a float rod, first means on said float rod for cooperating with said flow-indicating means and second means on said float rod for cooperating with said control means to cause said flow-limiting means to prevent greater flow when said flow approaches said predetermined maximum and to permit greater flow when said flow decreases from said predetermined maximum, said variable area meter and said flow-limiting means moving independent of each other and independent of said control means when said flow is substantially less than said predetermined maximum.

13. The device of claim 12 wherein said variable area meter moves independent of said control means in response to a small change in flow when said flow equals said predetermined maximum.

14. A device for measuring the flow of liquid passing through it and maintaining the flow thereof at a predetermined maximum, comprising a casing; flow-limiting means in said casing; an inlet side of said casing and an outlet side of said casing separated from said inlet side by said flow limiting means, said flow limiting means being movable to restrict the flow of liquid between said inlet side and said outlet side; a control chamber in said casing, said control chamber having a movable wall for expanding said control chamber in response to increased pressure in said control chamber, said movable wall being operatively connected to said flow-limiting means for moving said flow-limiting means to restrict the flow of liquid between said inlet side and said outlet side in response to increased pressure in said control chamber; first passage means between said inlet side and said control chamber; second passage means between said outlet side and said control chamber; flow-sensing means in said casing for determining flow through said device; and pilot means operatively connected to said flow-sensing means for restricting said second passage means when said flow approaches said predetermined maximum thereby increasing pressure in said control chamber and moving said flow-limiting means to restrict flow between said inlet and said outlet when said flow approaches said predetermined maximum, said pilot means moving to vary the restriction of said second passage means with changes in said flow above and below said predetermined maximum to increase and to decrease pressure respectively in said control chamber thereby moving said flow-limiting means to maintain said flow at said predetermined maximum.

15. The device of claim 14 wherein said flow-sensing means comprise a variable area meter, said pilot means being carried by said variable area meter.

16. The device of claim 14 wherein the pilot means comprise a first, movable, restriction valve member, and the second passage means comprise a second, fixed, valve member, said first valve member being proportioned and arranged to cooperate with said second valve member when said flow closely approaches said predetermined maximum.

17. The device of claim 16 wherein the second valve member is adjustable mounted in said device, whereby said predetermined maximum is adjustable by adjustment of the second valve member.

18. The device of claim 14 including a shutoff valve in said second passage means, said shutoff valve being operable to shut off flow through said device independent of said pilot means.

19. The device of claim 14 wherein said flow-limiting means comprise a skirt-guided plug.

UNITED STATES PATENT OFFICE
CERTIFICATE OF CORRECTION

Patent No. 3,593,575           Dated July 20, 1971

Inventor(s)         Horst R. Thieme

It is certified that error appears in the above-identified patent and that said Letters Patent are hereby corrected as shown below:

Column 1, line 59, "pivot" should read -- pilot--.
Column 3, line 61, delete repetitive phrase -- of the --.
Column 5, line 3, after "the" insert -- threaded rod 91 and hence for easy raising and lowering of the --. Column 5, line 26, "communicated" should read -- communicates --.

Signed and sealed this 28th day of March 1972.

(SEAL)
Attest:

EDWARD M. FLETCHER, JR.           ROBERT GOTTSCHALK
Attesting Officer                 Commissioner of Patents